United States Patent [19]

Cammarata

[11] Patent Number: 4,611,818
[45] Date of Patent: Sep. 16, 1986

[54] COLLAPSIBLE VEHICLE, PARTICULARLY OF THE TWO-WHEELED TYPE

[75] Inventor: Italo Cammarata, Pino Torinese, Italy

[73] Assignee: Quasar s.r.l., Torino, Italy

[21] Appl. No.: 720,199

[22] Filed: Apr. 4, 1985

[51] Int. Cl.⁴ .............................................. B62K 15/00
[52] U.S. Cl. ................................ 280/278; 74/551.4; 280/287
[58] Field of Search ......... 280/278, 287, 7.1, 87.04 R; 74/551.3, 551.4, 551.5

[56] References Cited

U.S. PATENT DOCUMENTS

| | | | |
|---|---|---|---|
| 1,611,307 | 12/1926 | Forse | 280/87.04 R |
| 1,658,068 | 2/1928 | White | 280/278 |
| 3,722,912 | 3/1973 | Housayama | 280/278 |
| 3,887,218 | 6/1975 | Di Blasi | 280/278 |
| 4,111,447 | 9/1978 | Ishida | 280/278 |
| 4,440,414 | 4/1984 | Wang | 280/278 |
| 4,462,606 | 7/1984 | Hon | 280/278 |

FOREIGN PATENT DOCUMENTS 442982 12/1948 Italy .................. 74/551.3

Primary Examiner—John J. Love
Assistant Examiner—Everett G. Diederiks, Jr.
Attorney, Agent, or Firm—Guido Modiano; Albert Josif

[57] ABSTRACT

This invention relates to a collapsible vehicle particularly of the two-wheeled type, which comprises a main frame supporting at least one rear wheel and a steering column pivotally connected to the cited frame ans supporting at least one front wheel. The peculiarity of the invention is that it comprises a saddle holder which encloses said frame laterally and is connected to the frame. The holder can be tilted toward the cited frame to bring the saddle forward of the frame. The upper section of the column is connected to the column to permit tilting toward said frame and handle bar sections are connected to the upper column section for tilting against the upper column section.

6 Claims, 8 Drawing Figures

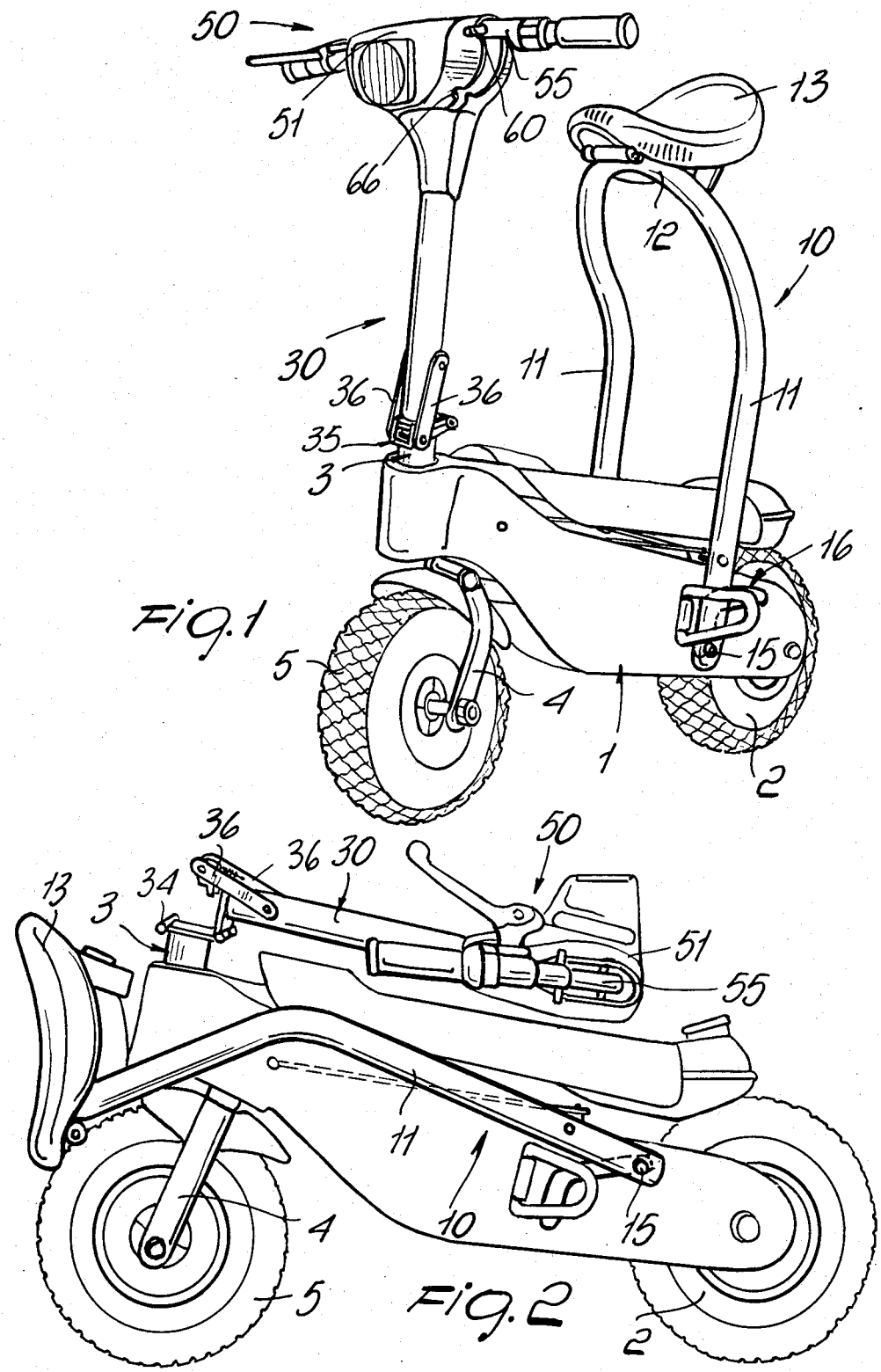

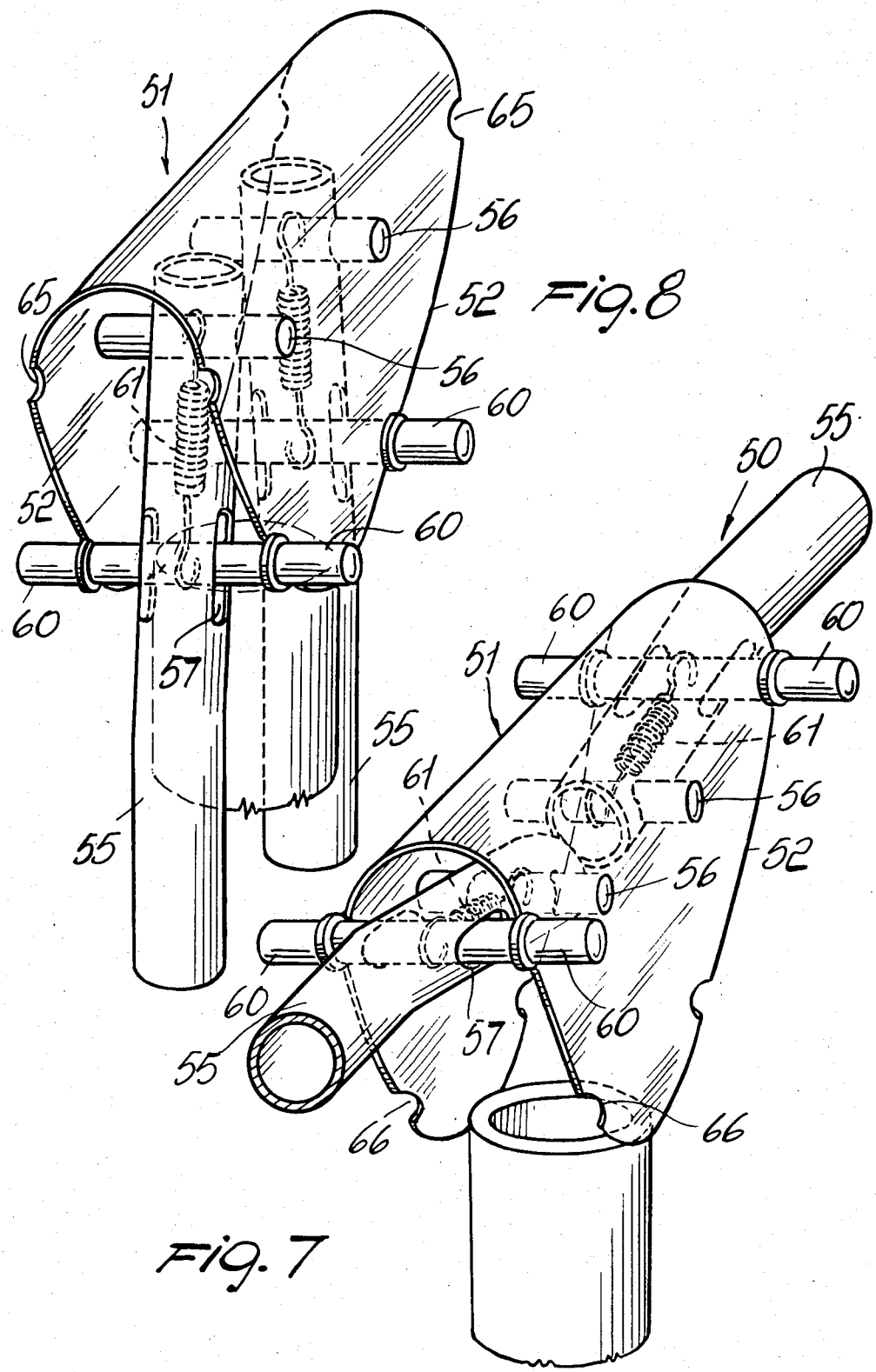

COLLAPSIBLE VEHICLE, PARTICULARLY OF THE TWO-WHEELED TYPE

BACKGROUND OF THE INVENTION

This invention relates to a collapsible vehicle, particularly of the two-wheeled type.

As is known, commercially available have been bicycles, motorcycles, and the like, which are designed to be made more compact when not actually in use.

Most embodiments usually provide a main frame which may be folded up to reduce the frame length dimension.

Other approaches provides, for making the vehicle less unwieldy, for the possibility of disassembling some accessory items, such as the saddle holder, steering column etc., thus removing those parts which have a substantially long dimension in a perpendicular direction to the length of the frame.

With all the prior embodiments, the operations involved in reducing the vehicles' overall dimensions generally require the utilization of tools, and sometimes separation of component parts, thereby operations are to be carried out which, while not being complex, are time-consuming and inconvenient for the user.

Another drawback of the prior art approaches is that the reduction in overall dimensions is in many cases accomplished to the detriment of the vehicles' full functionality.

SUMMARY OF THE INVENTION

It is the aim of the invention, accordingly, to remove such prior drawbacks by providing a collapsible vehicle particularly of the two-wheeled type, which affords a significant reduction of the overall dimensions when the vehicle is not being used without requiring the use of tools of any description, and by merely performing quickly carried out operations that do not require any special skill of the user.

Within the above aim, it is a particular object of the invention to provide a collapsible vehicle, whereby the vehicle overall dimensions can be reduced without detaching any of its parts, thus facilitating all the operations and making the resulting unit rational and functional.

Another object of this invention is to provide a collapsible vehicle which, owing to its peculiar constructive characteristics can give full assurance of being reliable and safe to use.

A not least object of this invention is to provide a collapsible vehicle which can be easily formed from commercially available elements and materials, and is competitive from a purely economical standpoint.

The above aim, and these and other objects such as will be apparent hereinafter, are achieved by a collapsible vehicle particularly of the two-wheeled type, according to the invention, comprising a main frame supporting at least one rear wheel and a steering column pivotally connected to said main frame and supporting at least one front wheel, characterized in that it comprises a saddle holder connected to said main fame and tiltable toward said main frame to bring said saddle forward of the main frame, the upper section of said steering column being connected to said steering column for tilting toward said main frame, the handle bar sections connected to said upper steering column section being tiltable toward said upper steering column section.

BRIEF DESCRIPTION OF THE DRAWINGS

Further features and advantages will be apparent from the following description of a preferred, but not exclusive, embodiment of this collapsible vehicle particularly of the two-wheeled type, as illustrated by way of example and not of limitation in the accompanying drawings, where:

FIG. 1 is a perspective view of this collapsible vehicle in its condition ready for use;

FIG. 2 shows the vehicle in its collapsed or packed condition;

FIG. 7 is a perspective view of the handle bar in its condition for use; and

FIG. 8 is a detail view of the handle bar in its folded condition.

DESCRIPTION OF THE PREFERRED EMBODIMENTS

Figure 3:
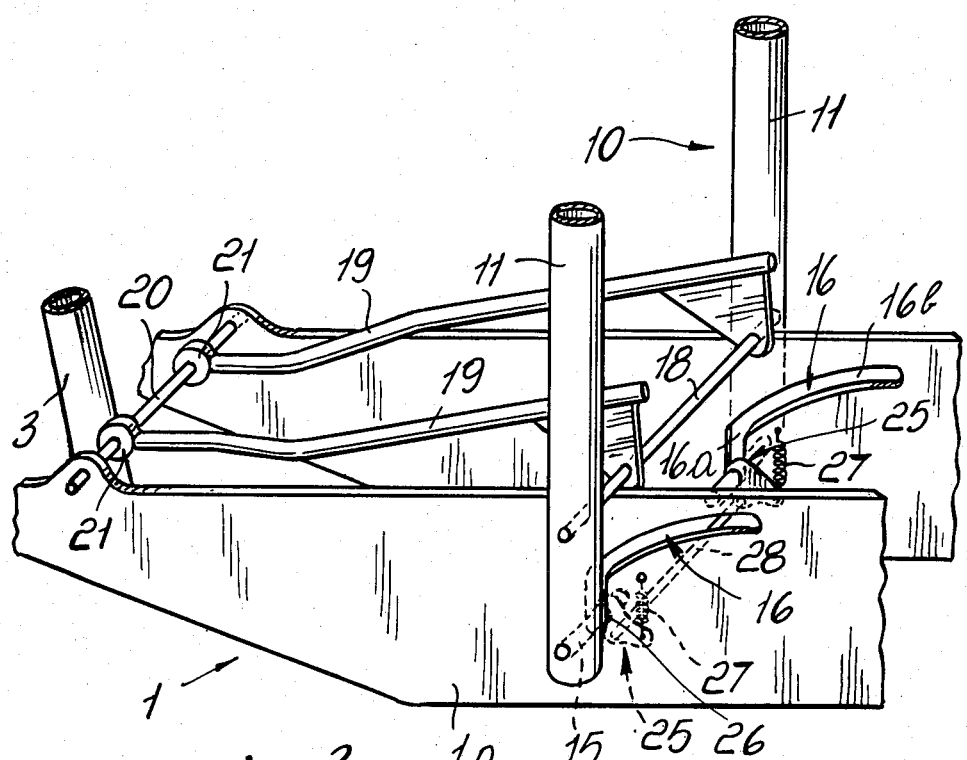
FIG. 3 is a partly cut-away perspective view showing the positioning of the saddle holder in the condition for use.

With reference to the drawing figures, this collapsible vehicle particularly of the two-wheeled type is schematically depicted therein as a motorcycle, and may have, of course, any other suitable configuration; that vehicle comprises a main frame 1 which is advantageously of elongate box type design.

The frame 1 supports a front wheel, indicated at 2, and a steering column 3 connected pivotally to the frame 1. The steering column 3 is connected to a front fork 4 whereto a front wheel 5 is connected.

A first feature of the invention is that the vehicle is provided with a saddle holder consisting of a rod-like body 10 which extends substantially into a U-like shape and has legs 11 which enclose the frame 1 laterally and are joined by a joining section 12 whereto the saddle 13 is connected.

The legs 11 of the rod-like body 10 have, at the bottom free ends thereof, pins 15, which may be replaced, however, with a single cross pin, which are engaged slidingly in contoured slots 16 defined on the sides 1a of the frame 1.

The contoured slots 16 have a substantially vertical section 16a, wherein the pins 15 are engaged, with the holder in its position for use, which merges with a mainly horizontal section 16b extending toward the rear of the frame 1.

The legs 11, at a middle portion thereof close to their free ends, are joined by a crosspiece 18 which is hinged to one end of rods 19 which are articulated with their other ends to a front crosspiece 20 carried on the sides 1a of the frame 1.

Advantageously, provided at the area of hinged connection between the front crosspiece 20 and rods 19 are rubber couplings 21 for damping any vibrations which may be generated.

The connection described above forms in practice a three-hinge arch consisting of the pins 15, cross-piece 18, and front crosspiece 20; the three-hinge arch is fixed, on locking the pin 15 in place, and in that position, supports the saddle holder 10 at a position close to the vertical.

The pins 15, as mentioned above, are received slidably within the slots 16 such that the holder 10 can be tilted toward the frame by utilizing the sliding travel of the free ends of the pins 15 towards the rear of the frame.

In the tilted position, the saddle 13 is located over the front wheel 5, forward of the frame.

To hold the pins 15 in their operating positions, ratchet pawls 25, advantageously hinged to the frame 1 and having a hooked end 26 in engagement with the pins 15 and at the other end a return spring 27 holding the pawls in the locked position, are provided.

For convenience in using the pawls 25, a joining rod 28 is provided which is passed through the frame sides and enables the pawls to be actuated simultaneously by acting on a single pawl.

Figure 4:
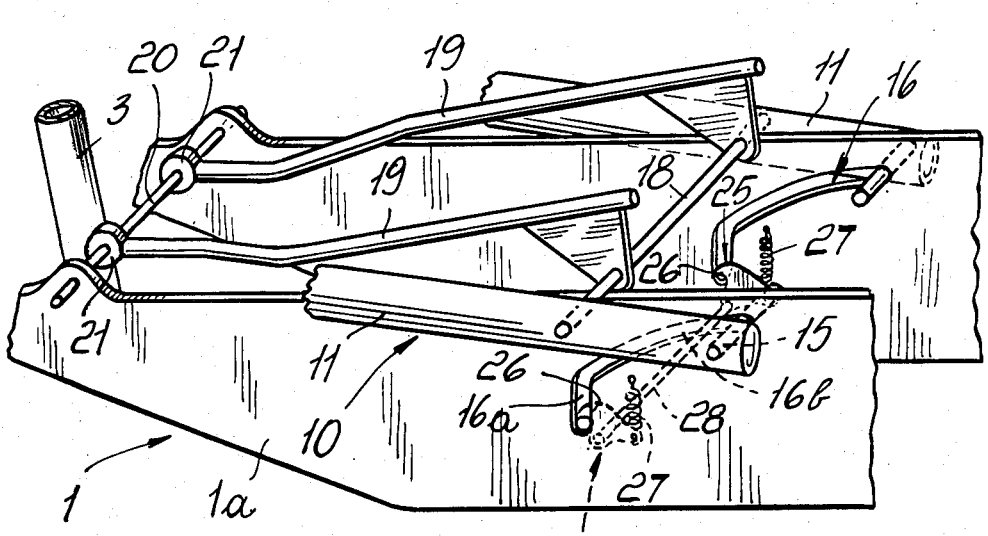
FIG. 4 shows schematically the saddle holder in its folded up condition.

With the arrangement described above, in order to tilt the saddle holder it will be sufficient to disengage the pawls 25, and in particular to move the hooked end 26 away from the pin 15 against the bias of the return springs 27. In practice the disengagement of the pawls from the pins 15 may be simply effected for example, by pulling the joining rod 28 downwards from underneath the frame, such operation being facilitated by virtue of the fact that the rod 28 may be positioned close to the bottom of the main frame thus being easily locatable and actuable, (see FIG. 4), or alternatively; the hooked end 26 of the pawl 25 may be configured such that when in engagement with the pins 15, (see FIG. 3), the curvature of the hooked end is sufficient to retain the saddle holder in an upright position in normal use, whilst a pushing force deliberately applied to the saddle holder in a forward direction would be sufficient to cause the pins 15 to be automatically released from the pawls.

On disengaging, the pins 15 may be slid in the slots 16, thus moving the pins 15 rearward from the frame, with consequent tilting toward the front portion of the holder 10.

As pointed out hereinabove, the frame 1 supports a steering column 3 pivotally therein; the steering column 3 has an upper section, generally indicated at 30, which is connected to the lower section of the steering column 3 for hinged connection and consequent tilting movement about a perpendicular axis to the main axis of the steering column.

Figures 5, 6:
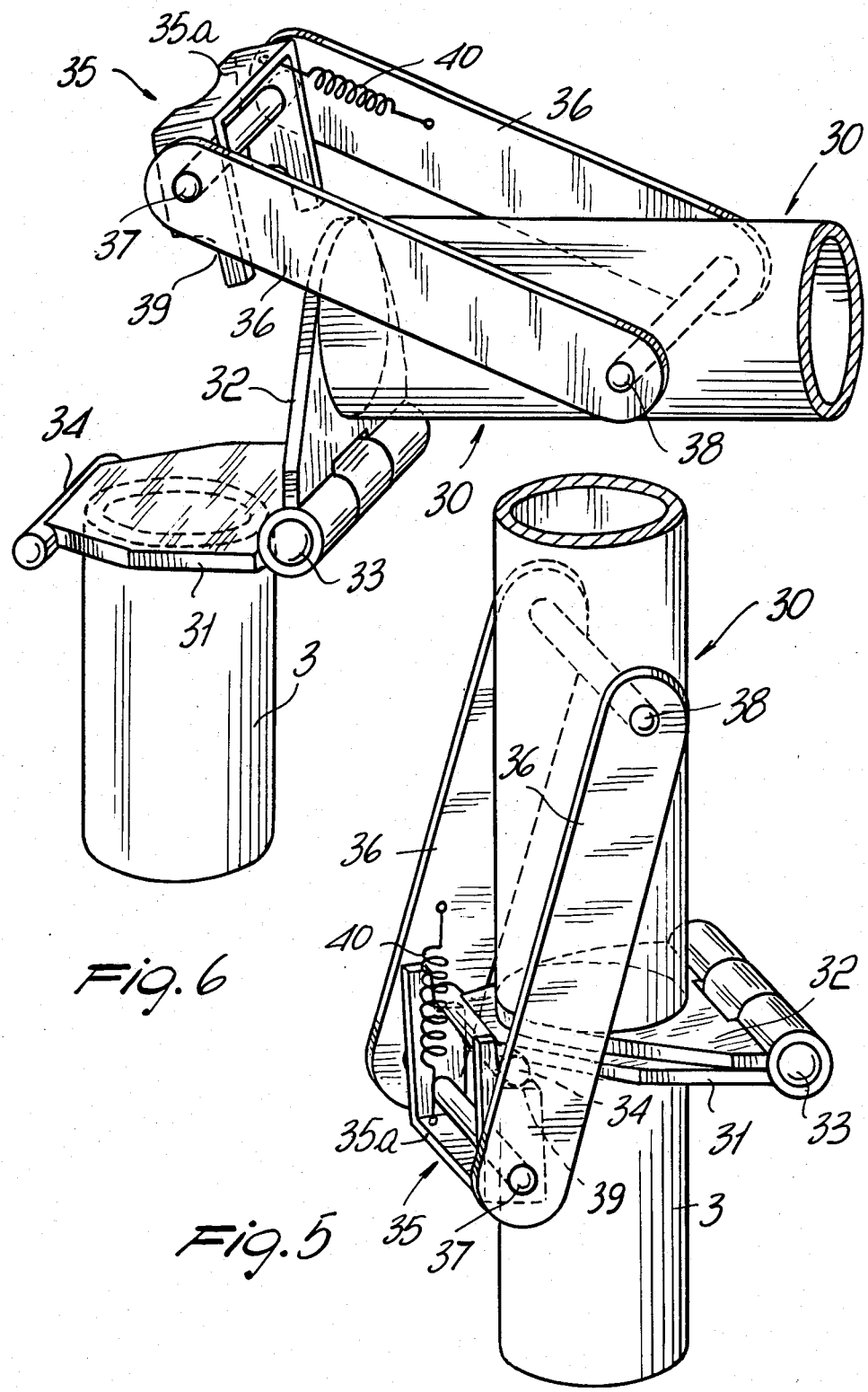
FIG. 5 is a perspective detail view of the steering column in its condition for use.
FIG. 6 shows the steering column in its folded condition.

In detail, and as shown in FIGS. 5 and 6, the steering column 3 has a lower plate 31 connected thereto which is hinged to an upper plate 32 rigidly connected to the upper section 30.

The hinge axis, as mentioned previously, is substantially perpendicular to the main direction of the steering column 3.

The lower plate 31 has, at the remote end from the hinge 33 connecting it to the upper plate 32, a cross detent 34 which may be hooked by the end of a stirrup 35 of substantially U-like shape which is hinged at 37 to the bottom ends of connecting rods 36 which are hinged with their other ends at 38 to the upper section 30.

The stirrup 35 has, at the free ends of its legs, a hooking portion 39 which engages with the detent 34.

An elastic means is then provided which comprises a spring 40 connected between a connecting rod 36 and the joining section 35a of the stirrup 35, which is located remotely from the hinge axis 37 with respect to the hooking portions 39.

With the arrangement described above, and with the steering column in its position for use, arrangements are provided whereby any pull exerted on the upper section 30 contributes toward an increase of the section clamping action relatively to the column 3, in fact, a line joining the hinge points 37 and 38 would be positioned toward the steering column and the detent 34 be positioned on the opposite side of the cited line from the steering column, thereby the pull actions exerted will tend to further close the connection.

To disengage, it will be sufficient to act on the stirrup 35 against the bias of the spring 40, thus disengaging the hooking portion 39 from the detent 34, in order to effect the rotation of the upper section 30 which tilts down onto the frame 1 by turning rearwardly.

In order to effect positioning in the position for use it will be sufficient to turn the section 30 in the opposite direction with a coupling which practically occurs with a snap action because, on aligning the hinge points 37 and 38 with the detent 34, any further rotary action toward the vertical position is facilitated by the bias force of the return spring 40.

Connected to the top end of the upper section 30 is a handle bar, generally indicated at 50, which has a center body 51 connected to the top end of the section 30 and curved side edges 52 which perform a camming function.

The center body 51 is connected as by hinges to the inward ends of the sections 55 of the handle bar through hinge pins 56 which are carried on the center body.

The sections 55 have, at a portion thereof close to the hinge pins 56, slots 57 elongated in the axial direction, which receive slidably therein cross pins 60 which act by contact on the cited side edges 52 of the center body 51.

Between the hinge pins 56 and cross pins 60 there act elastic means comprising traction springs 61 which hold the pins 60 pressed elastically against the edges 52.

The edges 52 define upper notches 65 wherein the pins 60 are inserted to lock the sections 55 in the open position for use. Also provided on the edges 52 are lower notches 66 wherein the pins 60 are engageable to lock the sections 55 in a position close against the upper section 30.

The edges 52 are shaped to vary the elastic action of the traction springs 61, so as to adjust the force which holds the sections 55 in the set position.

To move from one position to the other, it will be sufficient to apply a pulling force on the cross pins 60 and disengage them from the respective coupling notches, and then effect the rotation of the sections 55 about the hinge pins 56 until the cross pins 60 fit in the other notch which corresponds to the other position that the sections 55 may assume.

It may be appreciated from the foregoing that, with the constructional expedients discussed, a vehicle can be realized which is truly collapsible utilizing the tiltability of the saddle holder, steering column, and handle bar.

In practical use, to fold up the vehicle and bring it to its collapsed condition, it will be sufficient to first fold the sections 55 against the upper section 30 by acting, as previously indicated, on the cross pins 60 which can slide in the elongate slots 57.

Then the upper section 30 of the steering column is tilted down after disengaging the stirrup 35 from the detent 34 against the bias of the spring 40.

Thereafter, the saddle holder is tilted down by pivoting it toward the front, utilizing the sliding feature of the pins 15 in the contoured slot 16 defined in the main frame sides, thereby the holder 10 can be folded laterally to the frame to bring the saddle 13 to the front of the frame.

The invention herein is susceptible to many modifications and changes without departing from the purview of the inventive concept.

Furthermore, all of the details may be replaced with other, technically equivalent elements.

In practicing the invention, the materials used, so long as compatible with the specific use, as well as the dimensions and contingent shapes may be any ones depending on requirements.

I claim:

1. A collapsible vehicle particularly of the two wheeled type comprising a main frame, a steering column having an upper section, handle bar sections, at lest one front wheel, at least one rear wheel, rods, a saddle holder, a saddle, and a front crosspiece, said main frame being adapted for supporting said at least one rear wheel and said front crosspiece, said steering column being pivotally connected to said main frame and adapted for supporting said at least one front wheel, said upper section of said steering column being tiltable towards said main frame, said handle bar sections being associated with and tiltable towards said upper section, said saddle holder having a rod-like body, said rod-like body having a substantially U-like configuration defining legs, said legs being arranged laterally with respect to said main frame, each of said legs having a free end, a middle portion, and at least one pin at said free end of each of said legs, said main frame having defined thereon contoured slots, each said at least one pin being engageable in at least one of said contoured slots, said saddle holder being tiltable towards said main frame to bring said saddle forward of the main frame, said rods each having at least one end and at least one other end, said at least one end of each of said rods being hingedly connected to said middle portion of one of said legs, said at least one other end of each of said rods being hingedly connected to said front crosspiece.

2. A vehicle according to claim 1 further comprising rubber couplings, said at least one other end of each of said rods being hingedly connected to said front crosspiece with the interposition of at least one of said rubber couplings.

3. A vehicle according to claim 1 wherein said steering column further comprises a center body having cam-shaped side edges, elongate slots, cross pins, elastic elements and hinge pins, said center body being rigidly associated with said upper section, said hinge pins being adapted for hingedly associating said handle bar sections with said center body, said elongated slots being formed in said handle bar sections and being adapted for slideably accommodating said cross pins, said cam shaped side edges being adapted for sliding contact engagement relationship with said cross pins, each of said elastic elements being adapted for acting between at least one of said cross pins and at least one of said hinge pins.

4. A vehicle according to claim 3 wherein said cam shaped side edges of said center body comprise lower notches and upper notches, said lower notches and said upper notches being adapted to be engaged by said cross pins for locking said handle bar sections at a position for use and at a folded position respectively.

5. A vehicle according to claim 1 further comprising ratchet pawls, said ratchet pawls being hingedly connected to said main frame, each of said ratchet pawls having at least one hooked end, said at least one hooked end being releasably engageable with said at least one pin at said free end of each of said legs for locking said pin in said at least one of said contoured slots.

6. A vehicle according to claim 1 wherein said main frame defines a rear portion and said contoured slots each define a substantially vertical portion and a substantially horizontal portion, said substantially horizontal portion merging with said substantially vertical portion and extending towards said rear portion of said main frame, each said substantially vertical portion being engagable by said at least one pin when said saddle holder is in a position for use, each said substantially horizontal portion being engageable by said at least one pin when said saddle holder is tilted towards said main frame.

* * * * *